No. 753,616. PATENTED MAR. 1, 1904.
T. NICHOLSON.
CONVEYER OR CHUTE FOR INFILLING MATERIAL.
APPLICATION FILED JULY 26, 1902.
NO MODEL.
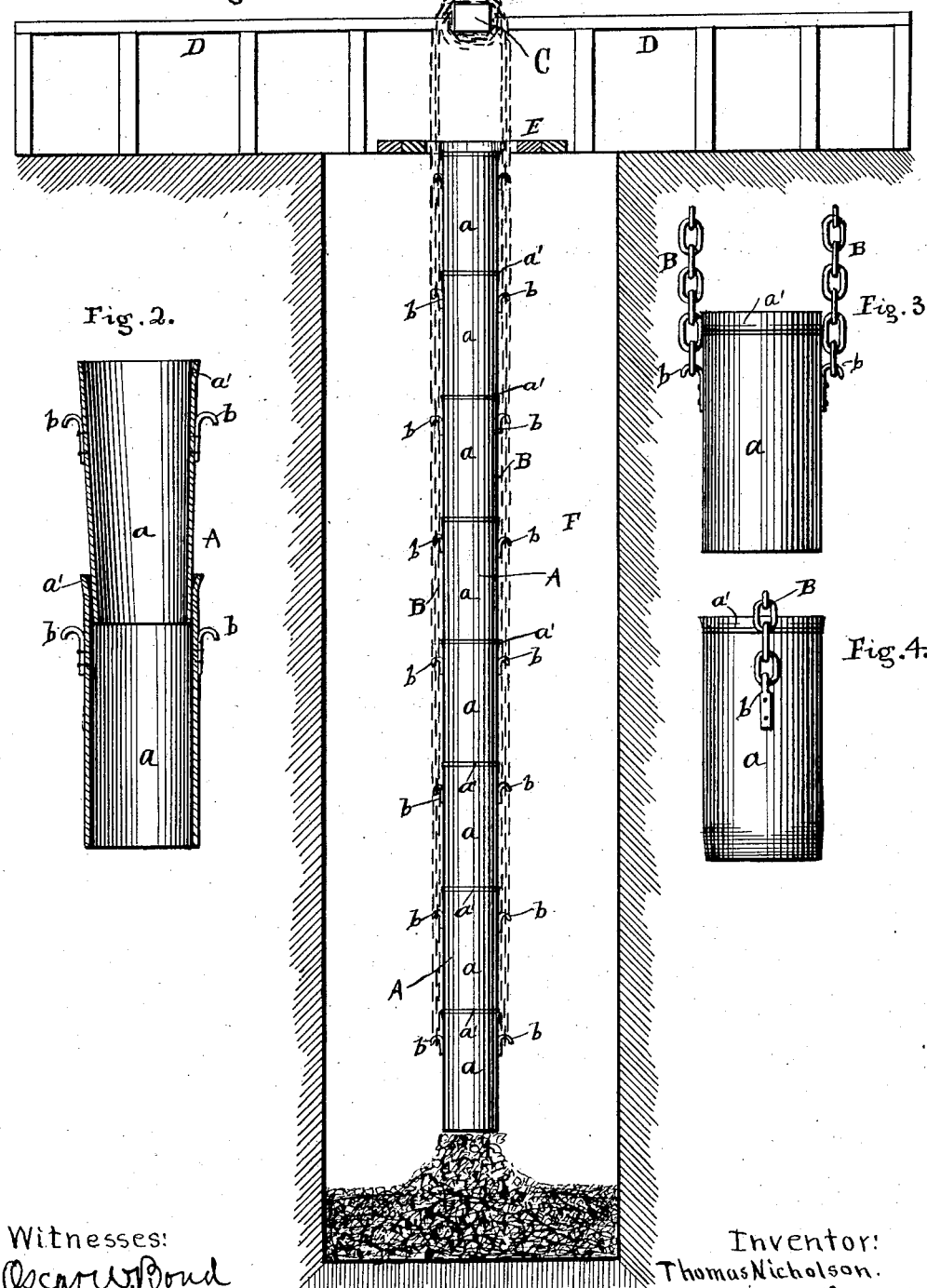

No. 753,616. Patented March 1, 1904.

UNITED STATES PATENT OFFICE.

THOMAS NICHOLSON, OF CHICAGO, ILLINOIS.

CONVEYER OR CHUTE FOR INFILLING MATERIAL.

SPECIFICATION forming part of Letters Patent No. 753,616, dated March 1, 1904.

Application filed July 26, 1902. Serial No. 117,087. (No model.)

*To all whom it may concern:*

Be it known that I, THOMAS NICHOLSON, a citizen of the United States, residing at Chicago, in the county of Cook and State of Illinois, have invented a certain new and useful Improvement in Conveyers or Chutes for Infilling Material, of which the following is a specification.

This invention relates more especially to means for conveying or delivery concrete, cement, mortar, and other material to the bottom of excavations, pits, and other similar inaccessible places, and has for its object to construct a conduit or tube made up in sections readily detachable one from the other and constituting as a whole a continuous chute or conveyer through which the material will pass to be delivered at the end of the conveyer or chute, to so suspend and support the sectional conduit or tube as to enable the same to be swung as a whole laterally without interfering with its operation as a conveyer or chute, and to improve generally the construction, arrangement, and operation of the conveyer or chute as a whole.

The invention consists in the features of construction and combinations of parts hereinafter described and claimed.

In the drawings, Figure 1 is an elevation showing a hole to be filled with the conveyer or chute of the invention suspended therein and reaching nearly to the bottom thereof; Fig. 2, a sectional elevation showing one manner of interlocking one section of the conduit or tube with another; Fig. 3, an elevation of a single section of the conduit or tube, showing a manner of attachment to the suspending-chain; and Fig. 4, an elevation of a single section of the conduit or tube, likewise showing the attachment to the suspending-chain.

The conveyer A is formed of a sectional conduit or tube, each section $a$ having a flaring end $a'$, into which is entered the end of the preceding section, so as to form a species of lap-joint or interlock of one section with another, the lap-joint or interlock furnishing a sufficiently-rigid connection between the sections to enable the conduit or tube as a whole to be swung laterally without breaking or disrupting the conveyer or chute, and it is preferred to have the lap or interlock on the inside, so as to present a smooth face for the downward passage of the material through the conveyer or chute. The sections can be made of sheet-iron or other sheet metal or light material of sufficient strength to withstand the wear and strain in use, and the sections can have a diameter of eight or ten inches and a length of four or five feet or such other diameter and length as may be desired, it being understood that the diameter and length should be such as to furnish a clear passage for the material through the conveyer or tube and to enable the lower section as the filling progresses upward to be readily detached and removed, so that the next preceding section will form the delivery end of the conveyer or chute. Each section of the conduit or tube in the arrangement shown has on opposite sides hooks or lugs $b$ of a form to be readily entered into the links of the suspending-chains B, one chain being provided for each side of the conveyer or chute. Each chain is lapped around or otherwise attached in the arrangement shown to a supporting-beam C on a platform or framework D, but could be otherwise attached to the beam, or the chains could be tied or connected to any suitable support at the upper end so long as the connection and the manner of suspending the chain is one that will hold the sections of the conduit or tube entered one into the other and interlocked, so that the conveyer or chute can be swung laterally as may be required to deliver and distribute the material within the hole or excavation to be filled. The upper end of the conduit or tube terminates at the top of the excavation or hole to be filled, and in the arrangement shown a planking or covering E is placed over the mouth of the hole or excavation, with a suitable opening therein for the end of the conveyer or chute and the passage of the suspending chains.

In use the conveyer or chute A, of a length to suit the depth of the excavation or hole F which is to be filled, is made up or constructed by attaching the lowermost section of the conduit or tube by its ears $b$ to a link of the chain on each side. The next preceding section is entered at its lower end into the upper end *a* of the first section, and the second section is attached to the chains by its hooks *b*, and the third section is entered at its lower end into the upper end of the second section and its hooks *b* caught into a link of the chain on each side, and section after section is added until the conduit reaches the proper distance above the bottom of the hole or excavation to be filled for the material to discharge from the lower section with sufficient space to be spread and compacted or otherwise manipulated in the excavation or hole, as shown in Fig. 1, where the material is shown as discharging from the conveyer or chute. When the filling has nearly reached the lower end of the first section of the conduit or tube, such first section is unhooked from the suspending chains, and the second section then becomes the discharging-section, and when the filling has nearly reached the height of the lower end of this second section such section is unhooked and the third section becomes the discharging-section, and so on until the upper section is reached, and as each section is unhooked it is to be removed from the hole or excavation by means of a rope (not shown) or otherwise, and the unused ends of the chains can be attached to a cord or cords (not shown) by which can be raised the chains, so as to be kept clear of the filling as the material is discharged into the excavation or hole. The concrete, cement, mortar, or other material to be filled into the excavation or hole is to be mixed in any usual and well-known manner at the top of the ground and from the place of mixing is to be carried or deposited on the platform E, from which it can be easily shoveled or otherwise deposited into the top of the conveyer or chute to pass down therein. The suspending of the conveyer or chute from above by means of chains or other flexible means, so as to hold the sections engaged one with the other, enables the operator or workman at the bottom of the excavation, hole, or pit by taking hold of the lower end of the conduit or tube to swing the discharge end sidewise or laterally in any direction required for directing the material to any desired point and so as to evenly and uniformly distribute the material as it falls from the conveyer or chute.

It will be seen that with my invention a conveyer or chute is provided made up of a sectional conduit, tube, or pipe, each section of which is adapted to be independently supported by a suspending chain or other suspending means, so that one section can be readily detached when necessary, or a section can be added when desired without the requirement of any special skill in detaching or attaching a section and without any waste of time in so doing; that the conduit or tube, while made up of sections, has the sections engaging one with the other by an overlapped joint or interlock, forming, in effect, a continuous conduit or tube or pipe with sufficient rigidity to allow the conveyer or chute as a whole to be swung without breaking or destroying the continuity or interfering with the free passage downward and discharge of the material at the lower end; that as the material rises in the excavation, hole, or pit to be filled the lowermost section of the conduit, tube, or pipe can be detached, leaving a complete conveyer or chute for continuing the filling operation, and the removed or detached section can be withdrawn, leaving the filling space for the reception of the material, that the removable or detachable sections enable the conveyer or chute to be lengthened or shortened at any time without any trouble or inconvenience, it only being necessary for shortening to detach a section and for lengthening to attach a section of the conduit or tube, and that the material can be deposited at the bottom of the excavation, hole, or pit, and its discharge be directed to any point desired through the rigidity of the conveyer or chute, by which the discharge end thereof can be swung to any point desired, so as to deposit the material in a uniform and even manner.

While the suspending means shown are chains, one on each side, it is to be understood that other suitable means, such as looped or knotted cables, wire, or rope may be employed for suspending the sections, each independently, and have the suspension to form a continuous conduit or tube.

The sections of the conduit or tube can be of the same diameter throughout their length except the flare at the receiving end of each section for entering the end of the preceding section and with light material for constructing the sections. The flare will enable the entering end of the section to be forced into the receiving end of the section, the metal or material contracting sufficiently for this purpose, or the entering end could be slightly contracted to facilitate the entering, if so desired, and instead of each section having a body of the same diameter its entire length the body of each section could be made slightly tapering, as shown for the upper section in Fig. 2, which would not interfere with the passage of the material through the conduit or tube.

It will be understood that instead of removing successively each lower section to foreshorten the conduit or tube as the excavation, hole, or pit is filled the conduit or tube could be bodily raised and the upper sections successively removed, thus attaining the same result of a clear space at the lower or discharge end of the conveyer or chute.

The essential and important feature of the present invention is the construction of a conveyer or chute for depositing infilling material from or by means of a sectional conduit, tube, or pipe the sections of which fit into each other snugly and tightly, giving a support at the joints and combining with such sectional conduit, tube, or pipe flexible suspending means which enable the conveyer or chute to be easily and readily swung at its lower end into discharging position as required, and while the invention has been described as to the construction of the conveyer or chute for infilling material somewhat minutely as to the details and arrangements of the various parts I do not intend thereby to limit myself to specific parts, details, or arrangement further than as the same are specified and called for in the claims, as it is the intention to make such changes in the several parts and elements as circumstances may render desirable or the work to be done may require without departing from the essential plan and features of the invention.

What I regard as new, and desire to secure by Letters Patent, is—

1. In a conveyer or chute for infilling material, the combination of a sectional conduit or tube having its sections detachably connected together and when connected having the entering ends of the sections interlocked one with the other, means for suspending the conduit or tube to hang free, and means for connecting each section independently and detachably to the suspending means, substantially as described.

2. In a conveyer or chute for infilling material, the combination of a sectional conduit or tube having its sections detachably connected together and when connected having close rigid joints at the entering ends of the sections, means for suspending the conduit or tube to hang free, and means for connecting each section independently and detachably to the suspending means, substantially as described.

3. In a conveyer or chute for infilling material, the combination of a conduit or tube consisting of a series of hollow cylindrical sections telescoped partially into each other at their adjacent ends and having rigid close joints at each of said telescopic connections, and means for suspending the conduit or tube and having the sections thereof independently and detachably connected thereto, whereby the conveyer or chute as a whole may be swung about at its lower end without pivotal or telescopic action at the joints and may be extended or shortened by the addition or removal of a section or sections, substantially as described.

4. In a conveyer or chute for infilling material, the combination of a conduit or tube consisting of a series of attachable and detachable hollow cylindrical sections having the same diameter and tapered to telescope partially into each other at their adjoining ends forming rigid joints when the sections are attached, means for suspending the conduit or tube to hang free, means for independently and detachably connecting the sections of the conduit or tube onto the suspending means, and a receiver for and from which the material can be introduced into the upper end of the conduit or tube to be discharged at the lower end thereof, substantially as described.

5. In a conveyer or chute for infilling material, the combination of a conduit or chute composed of separately-detachable sections rigidly connected together and having their ends telescoped into each other to make a tight joint and enable the conveyer or chute as a whole to be shifted bodily, laterally and vertically, means for suspending the conduit or tube to hang free, a support for the suspending means, and a receiver for and from which the material can be deposited into the upper end of the conduit or tube to be discharged at the lower end thereof, substantially as described.

6. In a conveyer or chute for infilling material, the combination of a sectional conduit or tube having its sections detachably connected together, and when connected having the entering ends of the sections interlocked, chains one on each side of the conduit or tube, a projecting catch on opposite sides of each section of the conduit or tube adapted to engage a link of the chain and detachably and independently connect each section of the conduit or tube to the chains, and a support for the chains at their upper ends, substantially as described.

THOMAS NICHOLSON.

Witnesses:
 OSCAR W. BOND,
 WALKER BANNING.